US012585573B2

(12) United States Patent
Viswambharan et al.

(10) Patent No.: US 12,585,573 B2
(45) Date of Patent: Mar. 24, 2026

(54) ASSEMBLING LOW-CODE APPLICATIONS WITH OBSERVABILITY POLICY INJECTIONS

(71) Applicant: Cisco Technology, Inc., San Jose, CA (US)

(72) Inventors: Rajesh Indira Viswambharan, Bangalore (IN); Saravanan Radhakrishnan, Tamilnadu (IN); Salmanul Faris K, Kerala (IN); Vinay Saini, Bangalore (IN); Ram Mohan Ravindranath, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 108 days.

(21) Appl. No.: 17/744,791

(22) Filed: May 16, 2022

(65) Prior Publication Data

US 2023/0367563 A1     Nov. 16, 2023

(51) Int. Cl.
*G06F 8/36* (2018.01)
*G06F 11/362* (2025.01)
*G06F 16/958* (2019.01)
*H04L 67/50* (2022.01)

(52) U.S. Cl.
CPC ............ *G06F 11/3644* (2013.01); *G06F 8/36* (2013.01); *G06F 16/972* (2019.01); *H04L 67/535* (2022.05)

(58) Field of Classification Search
CPC ...... G06F 8/36; G06F 16/972; G06F 11/3644; H04L 67/535
See application file for complete search history.

(56) References Cited

U.S. PATENT DOCUMENTS

| | | | |
|---|---|---|---|
| 11,055,417 B2 | 7/2021 | Bhatia et al. | |
| 11,233,815 B1 | 1/2022 | Rose | |
| 11,275,754 B2 | 3/2022 | Wilson et al. | |
| 11,294,646 B2 | 4/2022 | Khoyi et al. | |
| 2018/0246983 A1* | 8/2018 | Rathod ................ | G06F 16/972 |
| 2022/0217212 A1* | 7/2022 | Davey .................. | H04L 67/535 |

FOREIGN PATENT DOCUMENTS

CN        110825362 A      2/2020

OTHER PUBLICATIONS

Xiong et al, CN 111813646 (translation), Oct. 23, 2020, 11 pgs <CN_111813646.pdf>.*

(Continued)

*Primary Examiner* — Tuan A Vu
(74) *Attorney, Agent, or Firm* — Lee & Hayes, P.C.

(57) ABSTRACT

In one embodiment, an illustrative method herein may comprise: determining, by a process, a tenant-specific policy for creation of low-code applications; dynamically computing, by the process and based on the tenant-specific policy and one or more parameters associated with a particular low-code application to be created, one or more injectable low-code tasks for the particular low-code application; determining, by the process, a plurality of selected injectable low-code tasks from the one or more injectable low-code tasks; and creating, by the process, the particular low-code application by injecting the plurality of selected injectable low-code tasks into the particular low-code application for execution.

17 Claims, 9 Drawing Sheets

(56) References Cited

OTHER PUBLICATIONS

"OpenTelemetry", online: https://opentelemetry.io/, accessed May 2, 2022, 2 pages.

"Dynatrace Reviews & Ratings 2022", online: https://www.trustradius.com/products/dynatrace/reviews#features- scorecard, accessed May 2, 2022, 20 pages.

"Amazon CloudWatch Reviews and Ratings 2022", online: https://www.trustradius.com/products/amazon-cloudwatch/reviews, accessed May 2, 2022, 24 pages.

"AppDynamics Reviews & Ratings 2022", online: https://www.trustradius.com/products/appdynamics/reviews#overview, accessed May 2, 2022, 24 pages.

* cited by examiner

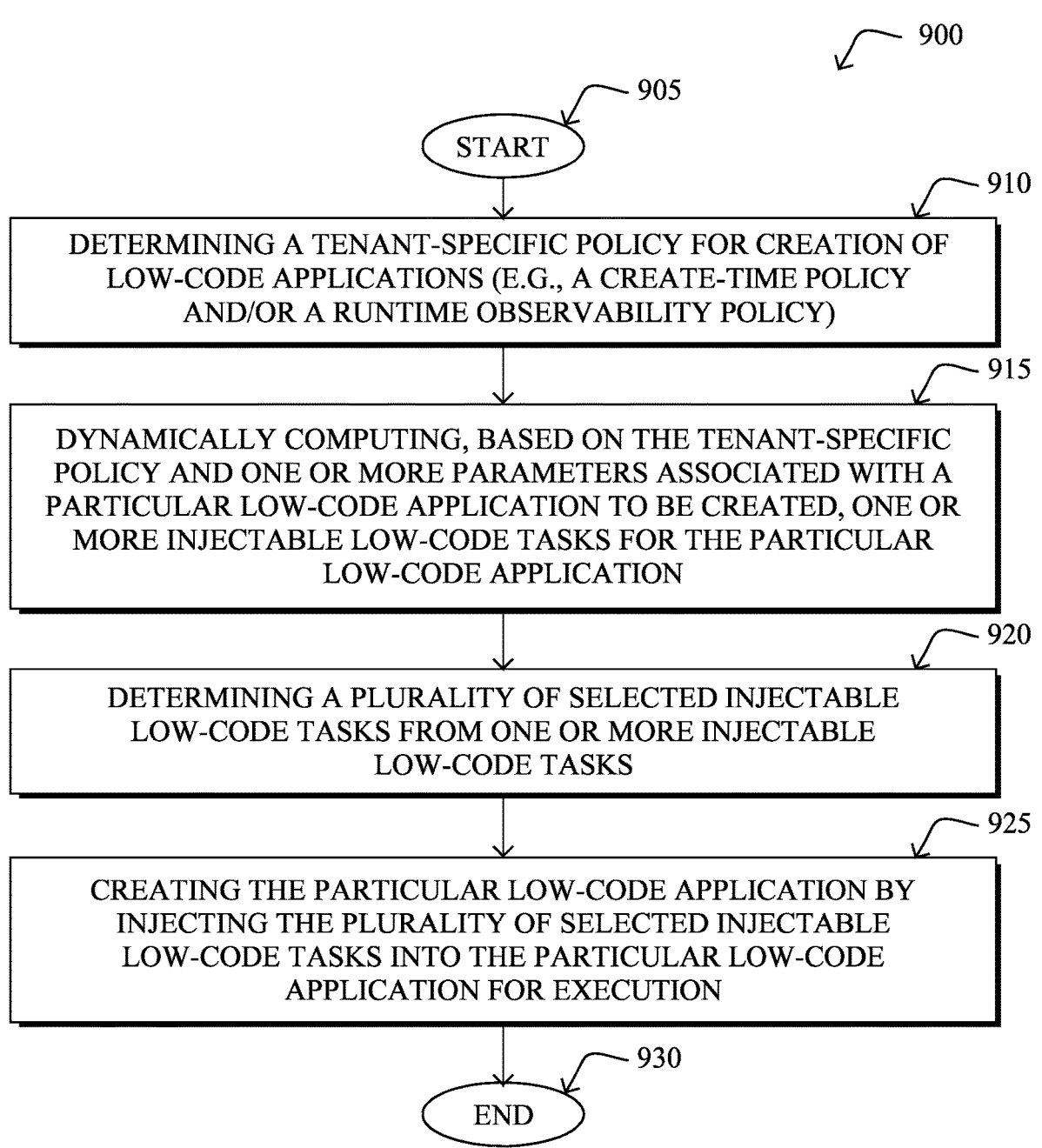

900

905

START

910

DETERMINING A TENANT-SPECIFIC POLICY FOR CREATION OF LOW-CODE APPLICATIONS (E.G., A CREATE-TIME POLICY AND/OR A RUNTIME OBSERVABILITY POLICY)

915

DYNAMICALLY COMPUTING, BASED ON THE TENANT-SPECIFIC POLICY AND ONE OR MORE PARAMETERS ASSOCIATED WITH A PARTICULAR LOW-CODE APPLICATION TO BE CREATED, ONE OR MORE INJECTABLE LOW-CODE TASKS FOR THE PARTICULAR LOW-CODE APPLICATION

920

DETERMINING A PLURALITY OF SELECTED INJECTABLE LOW-CODE TASKS FROM ONE OR MORE INJECTABLE LOW-CODE TASKS

925

CREATING THE PARTICULAR LOW-CODE APPLICATION BY INJECTING THE PLURALITY OF SELECTED INJECTABLE LOW-CODE TASKS INTO THE PARTICULAR LOW-CODE APPLICATION FOR EXECUTION

930

END

FIG. 9

ASSEMBLING LOW-CODE APPLICATIONS WITH OBSERVABILITY POLICY INJECTIONS

TECHNICAL FIELD

The present disclosure relates generally to computer systems, and, more particularly, to assembling low-code applications with observability policy injections.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In addition, low-code application platforms have gained immense momentum recently as they help enterprise users to rapidly build applications with little to no coding expertise. Users can simply design a use-case, and build an application through a "drag and drop" user interface to build individual tasks into an application workflow. One projection indicates that more than 65% of application development in the near future will be performed by low code platforms. Already, the recent pandemic has resulted in a massive remote-working, which has caused a rapid explosion of low-code based applications as well. Observability on these Low-code applications is a severe concern, perhaps more so than typical cloud applications.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 9 illustrates an example simplified procedure for assembling low-code applications with observability policy injections in accordance with one or more embodiments described herein.

DESCRIPTION OF EXAMPLE EMBODIMENTS

Overview

According to one or more embodiments of the disclosure, an illustrative method herein may comprise: determining, by a process, a tenant-specific policy for creation of low-code applications; dynamically computing, by the process and based on the tenant-specific policy and one or more parameters associated with a particular low-code application to be created, one or more injectable low-code tasks for the particular low-code application; determining, by the process, a plurality of selected injectable low-code tasks from the one or more injectable low-code tasks; and creating, by the process, the particular low-code application by injecting the plurality of selected injectable low-code tasks into the particular low-code application for execution.

In one embodiment, the tenant-specific policy comprises one or both of: a runtime observability policy to define observability requirements, and wherein one of the plurality of selected injectable low-code tasks comprises an observability task based on the runtime observability policy; and a create-time policy to compute available tasks based on pre-negotiated privileges and exposure restrictions, wherein the one or more injectable low-code tasks for the particular low-code application are based on a particular user and the pre-negotiated privileges and exposure restrictions.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computer network.
Figure 1:
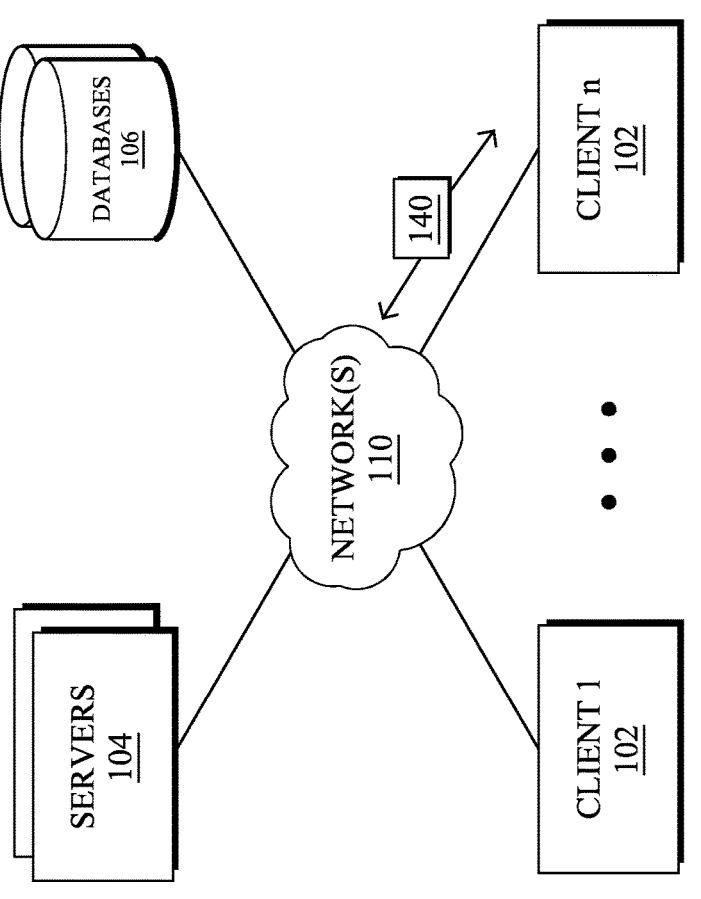

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to pre-defined protocols, such as the Transmission Control Proto-col/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autono-mous devices, or any other form of computing device capable of participating with other devices via network(s) 110.

Notably, in some embodiments, servers 104 and/or data-bases 106, including any number of other suitable devices (e.g., firewalls, gateways, and so on) may be part of a cloud-based service. In such cases, the servers and/or data-bases 106 may represent the cloud-based device(s) that provide certain services described herein, and may be dis-tributed, localized (e.g., on the premise of an enterprise, or "on prem"), or any combination of suitable configurations, as will be understood in the art.

Those skilled in the art will also understand that any number of nodes, devices, links, etc. may be used in com-puting system 100, and that the view shown herein is for simplicity. Also, those skilled in the art will further under-stand that while the network is shown in a certain orienta-tion, the system 100 is merely an example illustration that is not meant to limit the disclosure.

Notably, web services can be used to provide communi-cations between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be deliv-ered using cloud computing techniques. For example, dis-tributed applications can be provided using a cloud com-puting model, in which users are provided access to application software and databases over a network. The cloud providers generally manage the infrastructure and platforms (e.g., servers/appliances) on which the applica-tions are executed. Various types of distributed applications can be provided as a cloud service or as a Software as a Service (SaaS) over a network, such as the Internet.

Figure 2:
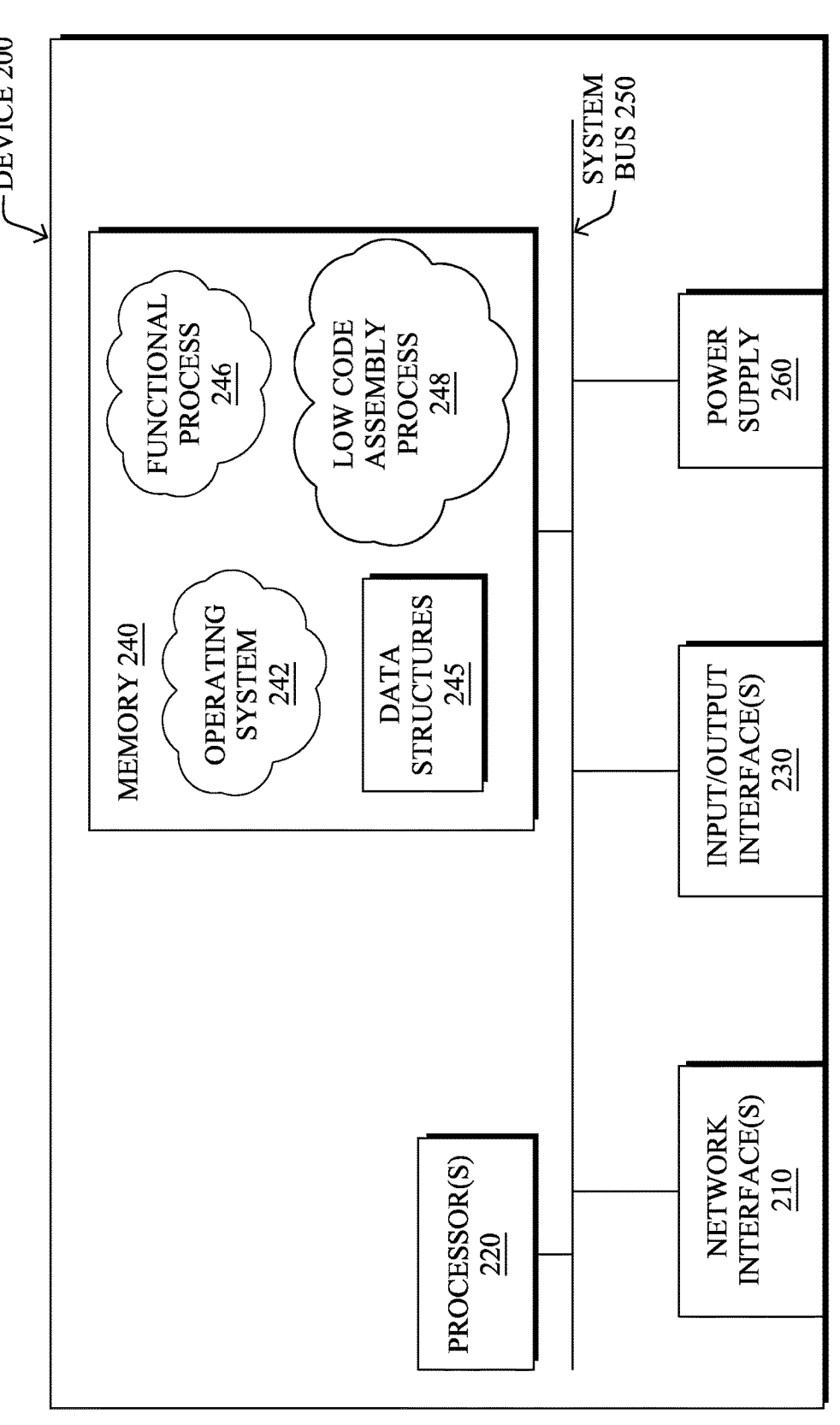
FIG. 2 illustrates an example computing device/node.

FIG. 2 is a schematic block diagram of an example node/device 200 that may be used with one or more embodi-ments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other informa-tion, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage loca-tions that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in sup-port of software processes and/or services executing on the device. These software processes and/or services may com-prise a one or more functional processes 246, and on certain devices, an illustrative "low-code assembly" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be config-ured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the function-ality of a similar process). Further, while the processes have been shown separately, those skilled in the art will appre-ciate that processes may be routines or modules within other processes.

Observability Intelligence Platform

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applica-tions are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
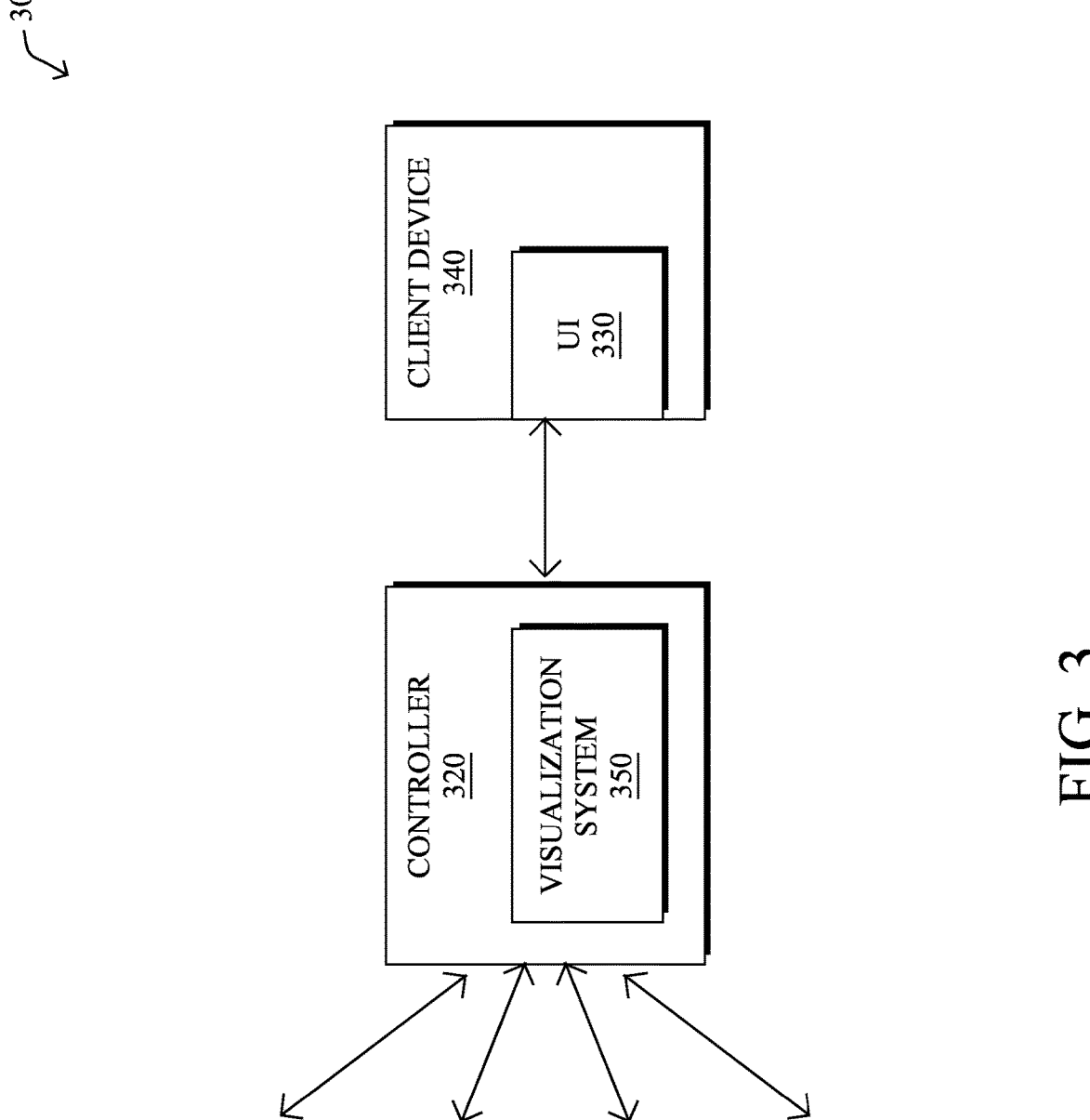
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the observability intelligence platform 300. In an illustrative on-premises (On-Prem) implementation, a controller instance 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

Assembling Low-Code Applications with Observability Policy Injections

As noted above, low-code application platforms have gained immense momentum recently as they help enterprise users to rapidly build applications with little to no coding expertise. Observability on these Low-code applications is a severe concern, perhaps more so than typical cloud applications. Notably, "Observability" in this sense is not just about getting metrics, traces, and logs alone. The scope of observability goes above-and-beyond for an enterprise when it comes to low-code-based applications, especially if the applications are hosted outside the security perimeter of the enterprise like public cloud.

Enterprises subscribe to low-code cloud services from the vendor or procure the instance and host it in a "demilitarized zone" (DMZ), perimeter network, or screened subnet (generally a physical or logical subnetwork that contains and exposes an organization's external-facing services to an untrusted, usually larger, network such as the Internet) for the consumption of the users. Over time, this may become unmanageable for the enterprise in terms of tracking the applications and the usage patterns and deployment whereabouts. The enterprise needs visibility during the creation, the operation time, along with the compliance aspects of these low-code applications on the cloud infrastructure.

Figure 4:
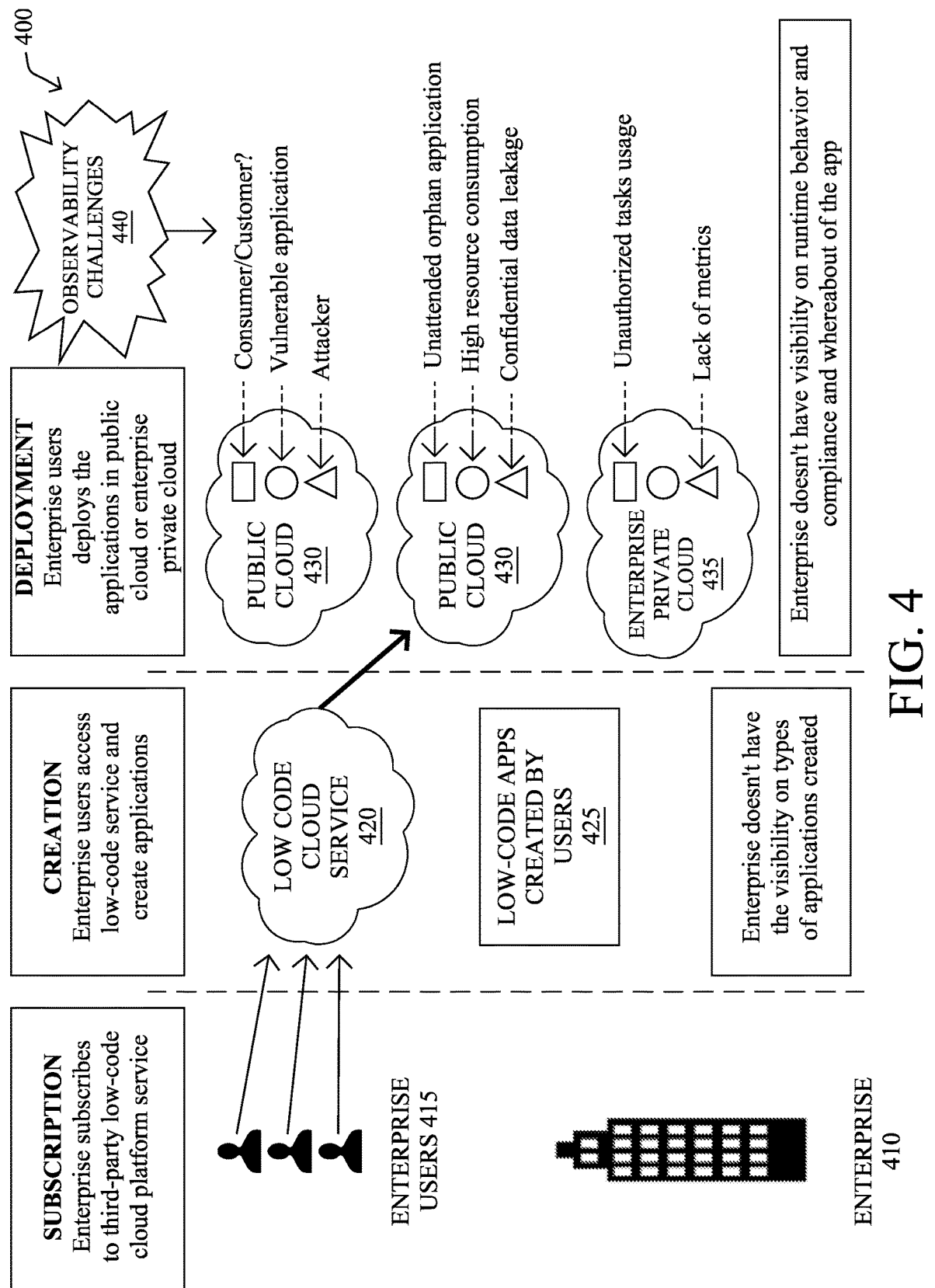
FIG. 4 illustrates an example low-code assembly diagram.

FIG. 4 illustrates a low-code assembly diagram 400 to provide insights into this problem space. The diagram 400 clearly depicts the different problems an enterprise 410 needs to tackle for the low-code applications in terms of observability. For instance, an enterprise 410 subscribes to a third-party low-code cloud platform service 420, where enterprise users 415 access the service to create low-code applications 425 (apps). Already, the enterprise doesn't have any visibility into the types of applications being created at this stage, or what functions are, or are not, being included. In deployment, the apps 425 are then pushed to public clouds 430 and private clouds 435 (e.g., enterprise private clouds), where the enterprise further has no visibility on runtime behavior and compliance, nor the whereabouts of the apps themselves. Numerous observability challenges (440) are thus presented, such as, for example:

knowing who are the consumers/customers;
application vulnerability;
attackers;
unattended orphan applications;
high resource consumption;
confidential data leakage;
unauthorized task usage;
lack of metrics;
etc.

In general, simply employing observability tools and/or software development kits (SDKs) available today will not be adequate, as the problems noted above are not merely on metrics, logs, and traces. There are many distinct requirements based on each tenant's (enterprise's, company's, etc.) security policies, ethics, and regional legal requirements. Specifically, these requirements may vary from tenant to tenant (enterprise to enterprise). that is, in the current scheme of things, enterprises cannot influence the low-code application creation with specific customization on observability requirements and policy enforcement on the application while creating and deploying the applications.

The techniques herein, therefore, provide various mechanisms for assembling low-code applications with observability policy injections. That is, the techniques herein provide a more customized behavior of observability by introducing an "Enterprise Observability Policy" through which an enterprise is able to negotiate its tenant-specific policies with the low-code vendor (e.g., at the time of registration). Vendors may then support the observability requirements as a self-composed task that is injected into the created low-code application as a hidden task, and then ensure that this observability task is enforced. Other policies may also be enforced, such as low-code task visibility/access during create time, and so on. Notably, as described below, the techniques herein are not static, but rather address dynamically computing (e.g., translating) particular enterprise policies into accessible and/or injectable tasks for a particular application (e.g., based on a number of tenant-based parameters).

Specifically, according to one or more embodiments described herein, an illustrative method herein may comprise: determining, by a process, a tenant-specific policy for creation of low-code applications; dynamically computing, by the process and based on the tenant-specific policy and one or more parameters associated with a particular low-code application to be created, one or more injectable low-code tasks for the particular low-code application; determining, by the process, a plurality of selected injectable low-code tasks from the one or more injectable low-code tasks; and creating, by the process, the particular low-code application by injecting the plurality of selected injectable low-code tasks into the particular low-code application for execution. Notably, as described in greater detail below, the tenant-specific policy comprises one or both of: a runtime observability policy to define observability requirements, and wherein one of the plurality of selected injectable low-code tasks comprises an observability task based on the runtime observability policy; and a create-time policy to compute available tasks based on pre-negotiated privileges and exposure restrictions, wherein the one or more injectable low-code tasks for the particular low-code application are based on a particular user and the pre-negotiated privileges and exposure restrictions.

Operationally, the techniques herein are generally based on three phases:

Phase 1: Negotiating Enterprise Observability Policy during Registration

Phase 2: Create Time Observability Task Insertion

Phase 3: Runtime Observability Enforcement

In the first phase, the techniques herein propose an "Enterprise Observability Policy", where a tenant (e.g., an enterprise) negotiates with the low-code vendor to bring in custom behavior on observability as demanded by the enterprise at the time of registration. The vendor may then enforce the tenant's specific observability policy on the created low-code applications. The enterprise observability policy captures two important aspects:

1. A create-time policy (e.g., what tasks can a code-creating user see); and

2. A runtime observability policy (e.g., used to create a hidden observability injectable task).

Note that at the time of registration, the enterprise may also provide access details of an associated Enterprise Authentication (Auth) server for authentication and privilege exchange, as well as the Callback URL to report the policy captured by the observability requirements.

Figure 5:
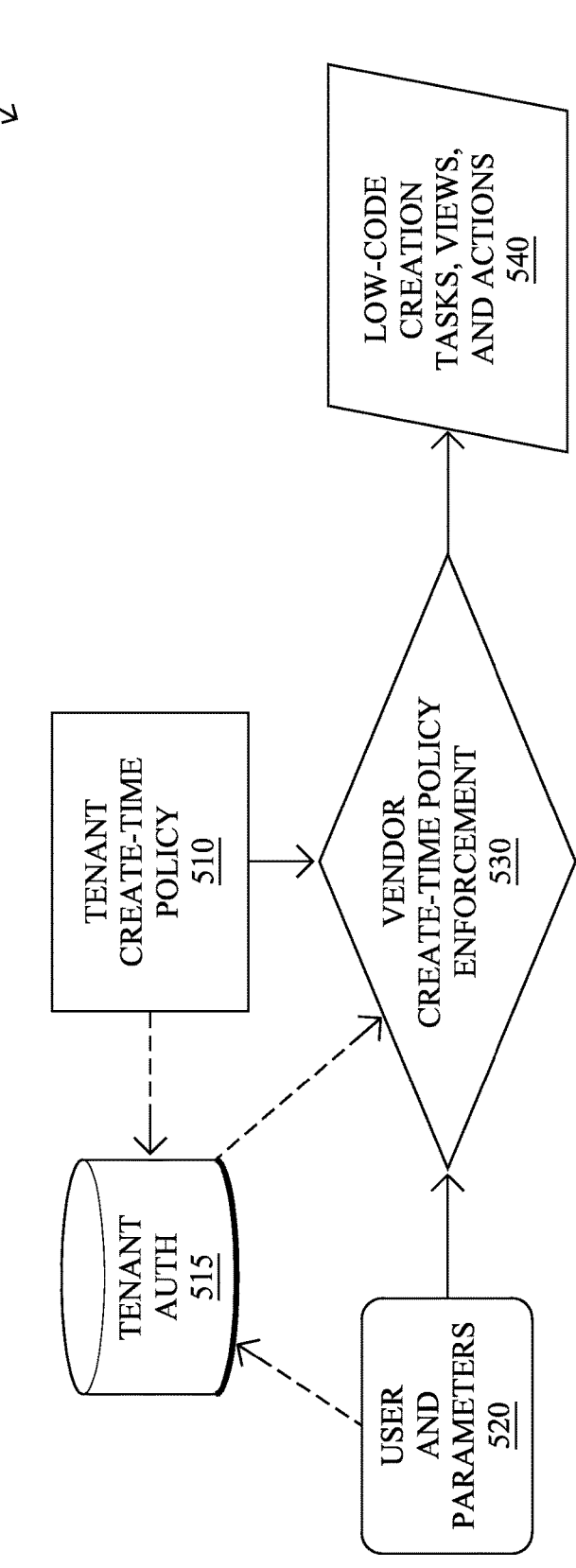
FIG. 5 illustrates an example diagram of create-time policy enforcement.

Regarding the create-time policy, as shown in the example diagram 500 of FIG. 5, the techniques herein allow specifying the enforcement of Enterprise user privileges in order to decide on the level of support for creating the application. For example, users' privileges may be exchanged as part of the users' successful authentication with the enterprise auth server while accessing the vendor service. Enterprise users' privileges will then control what is supported on the created applications, such as, for example:

Allowed and disallowed tasks from the list of low-code tasks;

Allowed usage (e.g., personal or exposed to other consumers);

Allowed deployment locations (e.g., private cloud or public cloud), times, regions, etc.;

And so on.

As shown, for example, a tenant create-time policy 510 may be applied to the specific user 520 (and associated parameters) by the vendor create-time policy enforcement engine 530 (e.g., with coordination with a tenant auth server 515, as noted above). As a result of this create-time policy enforcement, low-code creation services may provide (or prevent) specific tasks, views, actions, and so on during assembly of the low-code application by that particular user, accordingly.

Turning now to the runtime observability policy herein, each tenant (e.g., enterprise) may specify what types of runtime observability requirements are to be bundled for each created application. Illustratively, this comprises two parts: default/static observability and dynamic observability. Default/static observability, in particular, is the kind of observability modules/tools that enterprises want to be bundled in every low-code application by default. This is more of basic hygiene requirement (like metrics, logs, traces, etc.). Dynamic observability, on the other hand, is the set of observability features to be enabled will be specific to the sensitivity of the final application.

For instance, dynamic observability may include such things as a sensitivity score, where every created application may have the sensitivity score derived for it. The score may be derived based on multiple attributes that the enterprise is keen on. Some of the sample parameters include, for example, target consumer profiles of the application (e.g., customer use), deployment location (e.g., public cloud), types of tasks used (e.g., tasks usage of sensitive data which needs full security, etc.). The attributes deciding the sensitivity of the application will have the associated observability requirements that enterprise demands to be supported.

Additionally, for dynamic observability, enterprise can also define rules such as the frequency of reporting the observability metrics, fail-over requirements, and outage policies, etc. based on the sensitivity score of the application. For instance, the higher the sensitivity score, the more stringent the observability enforcement will be.

Some of the sample observability requirements under the dynamic observability category may be, for example:

Monitor and report the software vulnerability on composed task;

Data Leak Prevention (DLP) enforcement;

Orphan application tracking (e.g., application not used for more than the stipulated time);

Target consumer profiles enforcement (e.g., only enterprise authenticated users can access the app);

Time factor enforcement (e.g., time zones, times when allowed, etc.);

And so on.

According to the techniques herein, the observability policy is specific to the individual tenant/enterprise. For example, as shown in the example diagram 600 of FIG. 6, a low-code vendor/cloud service 610 maintains repository 630 to map the tenant/enterprise observability policy with tenant/enterprise accounts. In this manner, each tenant/enterprise can have their own observability policy that is more specific to their individual policies, ethics, and the regions of business. As shown, for instance, "Enterprise1" may have an observability policy 620, while "Enterprise2" may have an observability policy 625.

In the second phase of the embodiments herein, observability task insertion during create time, it is important to note that low-code applications are based on stitching independent tasks together to create a final application, where users can drag and drop the individual tasks to build the application.

The techniques herein, therefore, provide a custom tenant/enterprise policy hidden task. That is, the techniques herein provide a mechanism where the negotiated observability policy for the run time low-code app as specified above is dynamically created as a self-composed task. This task will be injected into the created workflow as a hidden task which will be controlling the runtime observability requirements of the enterprise for capturing the required data and reporting. The tasks may perform data capture and/or analysis, and report creation, thus exposing to the enterprise all that is desired to be controlled through the injected observability task.

Figure 6:
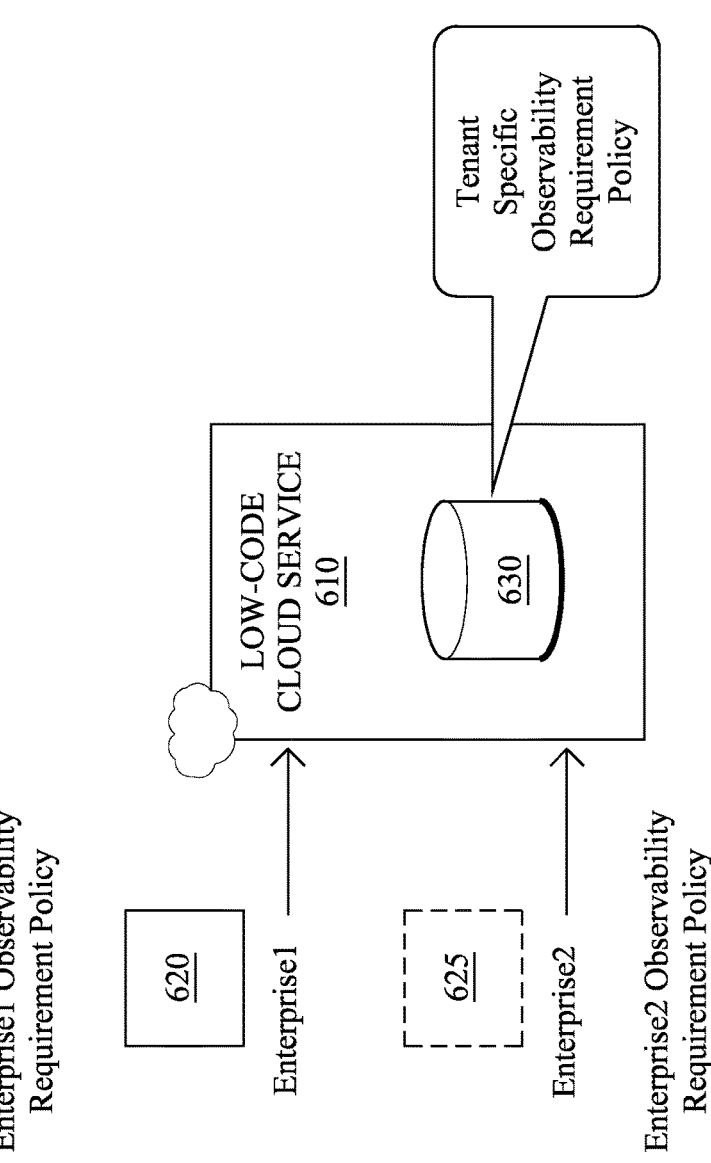
FIG. 6 illustrates an example diagram of multi-tenant create-time policy enforcement.
Figure 7:
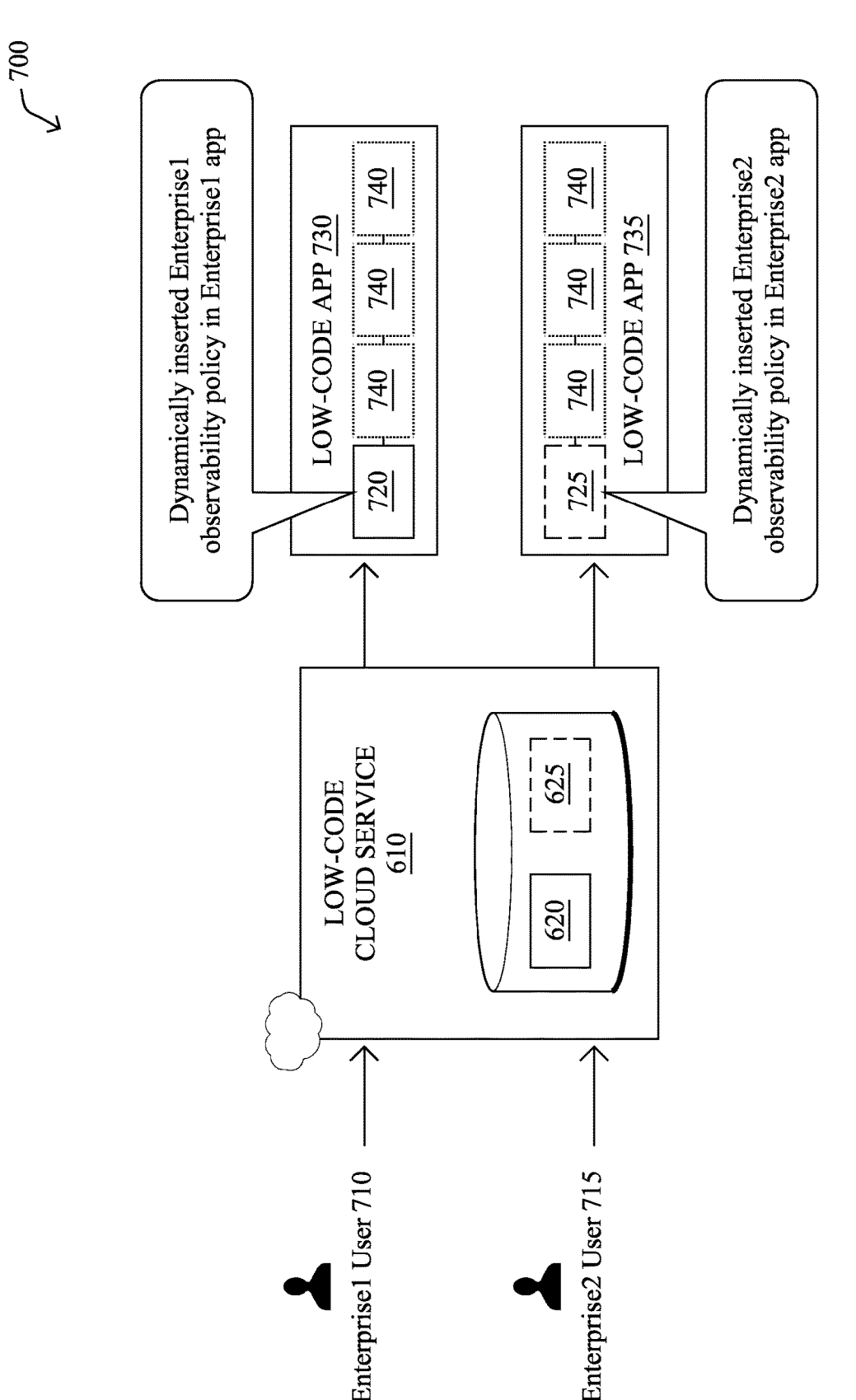
FIG. 7 illustrates an example diagram of low-code application development during create-time policy enforcement.

FIG. 7 illustrates an example diagram 700 expanding on FIG. 6 above, where policies 620 and 625 are shown stored within the repository, such that when a first user 710 (e.g., from Enterprise1) creates a low-code application 730, the associated (e.g., hidden) observability task 720, based on policy 620, may be inserted within the application 730, along with the user-selected code tasks 740. Similarly, when a second user 715 (e.g., from Enterprise2) the corresponding observability task 725, now based on policy 625, may be inserted into this application 735.

In particular, whenever an enterprise user logs into the low-code service 610, the low-code service will enforce the low-code creation policy (620/625) according to what is negotiated for the enterprise. This includes the considering the user's profile and allowing the respective tasks, etc., as mentioned above. Once the application is created based on the sensitivity of the application, the dynamic observability task will be composed with all requirements and injected into the application.

Now, in the third phase of the techniques herein, observability enforcement during runtime, once the application is deployed, the hidden task will take effect. As captured in the hidden task, application observability requirements will be monitored and the respective info will be reported back to the enterprise through the given callback.

Figure 8:
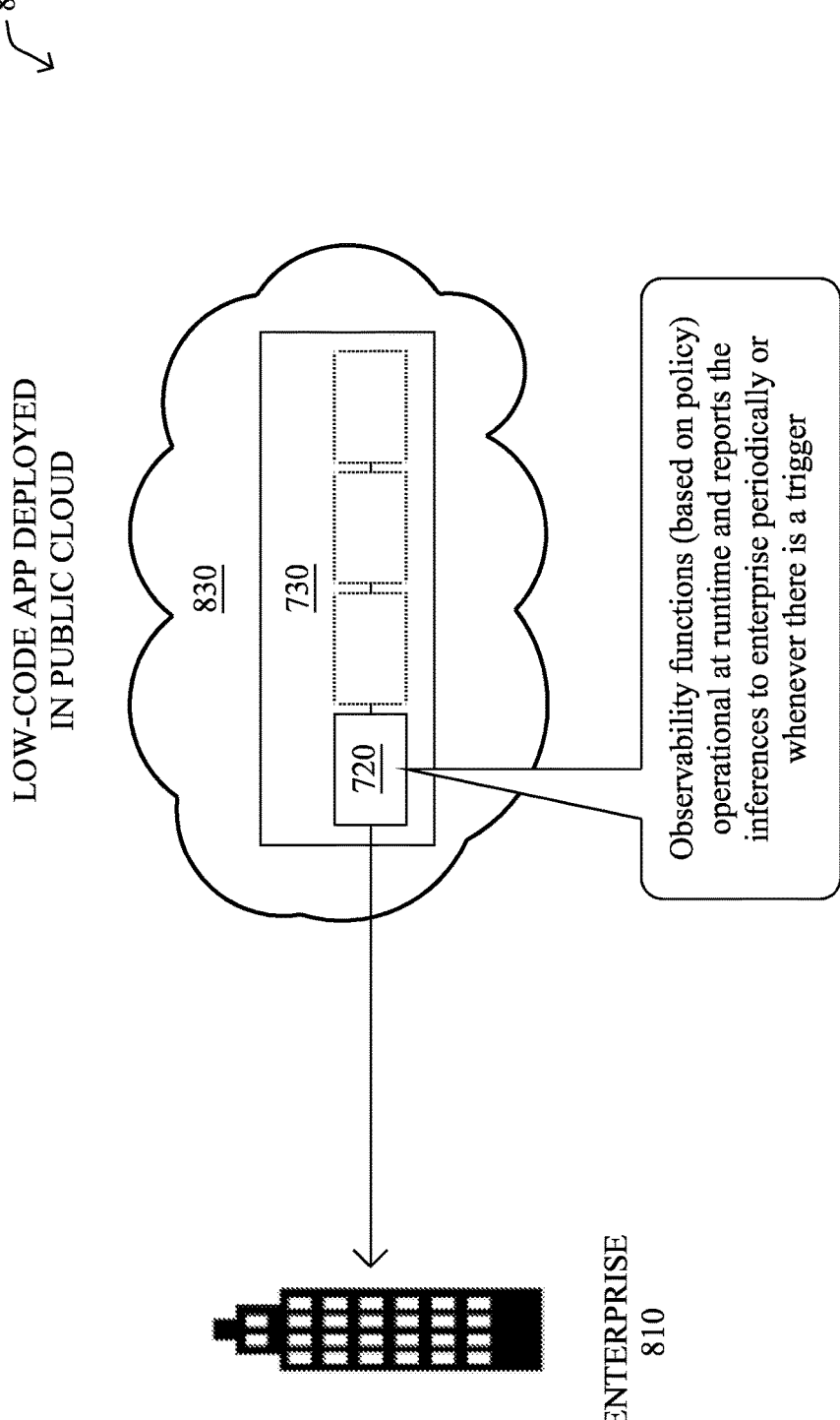
FIG. 8 illustrates an example diagram of runtime observability enforcement.

FIG. 8 illustrates an example diagram 800 of runtime observability enforcement. In particular, as shown, an enterprise 810 deploys their low-code app (e.g., 730) into the public cloud 830, where the injected observability task 720 creates observability functions (based on the policy) that are operational at runtime, reporting any inferences to the enterprise, e.g., periodically or whenever there is a trigger.

Based on the embodiments above, therefore, the techniques herein may, for example, monitor software vulnerability on a composed task and report back. For instance, if this observability requirement is captured, then the respective observability agent has the details of the software stack and version used in the application, and checks periodically if there is any vulnerability reported on the application (e.g., a Common Vulnerabilities and Exposures (CVE) database), and if any critical severity is identified, then it will be reported back to the enterprise and the enterprise can deactivate the application. As an alternative example, the techniques herein may provide orphan application tracking, such that if the application is deployed in a public cloud and not used for a given duration this will be reported back, so the enterprise can decide whether to make it dormant. Other example use cases may be conceived for the techniques herein, and the above are merely examples not meant to be limiting to the scope of the present disclosure.

In closing, FIG. 9 illustrates an example simplified procedure for assembling low-code applications with observability policy injections in accordance with one or more embodiments described herein, particularly from the perspective of a low-code service device/process. For example, a non-generic, specifically configured device (e.g., device 200, such as part of a low-code vendor service) may perform procedure 900 by executing stored instructions (e.g., process 248).

The procedure 900 may start at step 905, and continues to step 910, where, as described in greater detail above, the process determines a tenant-specific policy for creation of low-code applications. As described above, this tenant-specific policy may be pre-negotiated, and may comprise one or both of a) a runtime observability policy to define observability requirements, and wherein one of the plurality of selected injectable low-code tasks comprises an observability task based on the runtime observability policy, and b) a create-time policy to compute available tasks based on pre-negotiated privileges and exposure restrictions, wherein the one or more injectable low-code tasks for the particular low-code application are based on a particular user and the pre-negotiated privileges and exposure restrictions.

As described in greater detail above, the observability task may be a self-composed auto-injected observability-based task, and may be hidden from a user selecting injectable low-code tasks for the particular low-code application. Also, the create-time policy may define weightage of attributes to calculate a sensitivity of the particular low-code application, and the runtime observability policy may cause reports to be sent at a periodic frequency based on the sensitivity of the particular low-code application, such as where the runtime observability policy generates reports that are one or both of either periodic or trigger-based. Furthermore, the tenant-specific policy may comprise a callback uniform resource locator (URL) for the particular low-code application to send reports regarding the runtime observability policy.

As also further described above, the create-time policy may define:

specifically allowed and/or disallowed tasks for the one or more injectable low-code tasks for the particular low-code application;

one or more allowed usage parameters;

one or more of: allowed and/or disallowed network locations; allowed and/or disallowed activation times; and allowed and/or disallowed deployment geographic regions; and/or other privileges and exposure restrictions.

In step 915, the process may then dynamically compute, based on the tenant-specific policy and one or more parameters associated with a particular low-code application to be created, one or more injectable low-code tasks for the particular low-code application. In step 920, the process may then determine a plurality of selected injectable low-code tasks from the one or more injectable low-code tasks, and in step 925, creates the particular low-code application by injecting the plurality of selected injectable low-code tasks into the particular low-code application for execution.

The simplified procedure 900 may then end in step 930. Other steps may also be included generally within procedure 900. For example, such steps (or, more generally, such additions to steps already specifically illustrated above), may include: determining the one or more parameters associated with the particular low-code application to be created based on coordination with an authentication server during login of a particular user creating the particular low-code application; auto-injecting one or more unselected tasks in addition to user selected tasks based on the tenant-specific policy; and so on.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for assembling low-code applications with observability policy injections. In particular, the techniques herein provide a low code agent, where instrumentation can be injected as a hidden task into low-code apps, allowing for per-tenant observability policy enforcement. The techniques herein also provide for create-time policy enforcement, allowing control of what goes into the low-code apps to begin with.

Specifically, the techniques herein provide:

The ability to capture the enterprise specific observability policy in a more granular manner (Create and Runtime) to support customized observability requirements;

The ability to support multiple attributes in deciding the sensitivity of the application and accordingly control observability support enablement;

The ability to create a dynamically composed task with the observability tools/modules and rules and inject that as a hidden task to the created low-code application; and The ability to enforce the observability requirements based on the enterprise policy and report back to the enterprise Illustratively, the techniques described herein may be performed by hardware, software, and/or firmware, such as in accordance with the illustrative low-code assembly process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: determining, by a process, a tenant-specific policy for creation of low-code applications; dynamically computing, by the process and based on the tenant-specific policy and one or more parameters associated with a particular low-code application to be created, one or more injectable low-code tasks for the particular low-code application; determining, by the process, a plurality of selected injectable low-code tasks from the one or more injectable low-code tasks; and creating, by the process, the particular low-code application by injecting the plurality of selected injectable low-code tasks into the particular low-code application for execution.

In one embodiment, the tenant-specific policy comprises a runtime observability policy to define observability requirements, and wherein one of the plurality of selected injectable low-code tasks comprises an observability task based on the runtime observability policy. In one embodiment, the observability task is a self-composed auto-injected observability-based task. In one embodiment, the self-composed auto-injected observability-based task is hidden from a user selecting injectable low-code tasks for the particular low-code application. In one embodiment, the tenant-specific policy comprises a create-time policy that defines weightage of attributes to calculate a sensitivity of the particular low-code application, and wherein the runtime observability policy causes reports to be sent at a periodic frequency based on the sensitivity of the particular low-code application. In one embodiment, the tenant-specific policy comprises a callback uniform resource locator (URL) for the particular low-code application to send reports regarding the runtime observability policy. In one embodiment, the runtime observability policy generates reports that are one or both of either periodic or trigger-based.

In one embodiment, the tenant-specific policy comprises a create-time policy to compute available tasks based on pre-negotiated privileges and exposure restrictions, wherein the one or more injectable low-code tasks for the particular low-code application are based on a particular user and the pre-negotiated privileges and exposure restrictions. In one embodiment, the create-time policy defines specifically allowed and/or disallowed tasks for the one or more injectable low-code tasks for the particular low-code application. In one embodiment, the create-time policy defines one or more allowed usage parameters. In one embodiment, the create-time policy defines one or more of: allowed and/or disallowed network locations; allowed and/or disallowed activation times; and allowed and/or disallowed deployment geographic regions.

In one embodiment, the one or more parameters associated with the particular low-code application to be created are based on coordination with an authentication server during login of a particular user creating the particular low-code application.

In one embodiment, determining the plurality of selected injectable low-code tasks from the one or more injectable low-code tasks comprises auto-injecting one or more unselected tasks in addition to user selected tasks based on the tenant-specific policy.

According to the embodiments herein, an illustrative tangible, non-transitory, computer-readable medium herein may have computer-executable instructions stored thereon that, when executed by a processor on a computer, may cause the computer to perform a method comprising: determining a tenant-specific policy for creation of low-code applications; dynamically computing, based on the tenant-specific policy and one or more parameters associated with a particular low-code application to be created, one or more injectable low-code tasks for the particular low-code application; determining a plurality of selected injectable low-code tasks from the one or more injectable low-code tasks; and creating the particular low-code application by injecting the plurality of selected injectable low-code tasks into the particular low-code application for execution.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: a memory configured to store a process that is executable by the processor, the process, when executed, configured to: determine a tenant-specific policy for creation of low-code applications; dynamically compute, based on the tenant-specific policy and one or more parameters associated with a particular low-code application to be created, one or more injectable low-code tasks for the particular low-code application; determine a plurality of selected injectable low-code tasks from the one or more injectable low-code tasks; and create the particular low-code application by injecting the plurality of selected injectable low-code tasks into the particular low-code application for execution.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:

determining, by a process, a tenant-specific policy for creation of low-code applications by a specific tenant, the tenant-specific policy specifying at least one required observability module for the low-code applications, each of the at least one required observability module representing a corresponding observability task to be performed;

presenting, by the process via a drag and drop user interface, a plurality of executable low-code modules representing functional tasks for inclusion in an application workflow, each low-code module comprising pre-built code segments that can be programmatically linked into runnable low-code applications;

receiving, by the process, user selections of one or more user-selected low-code modules of the plurality of executable low-code modules for the application workflow;

automatically enforcing, by the process and prior to finalization of the application workflow, the tenant-specific policy by inserting the at least one required observability module into the application workflow in addition to the one or more user-selected low-code modules; and generating, by the process, a particular low-code application by programmatically linking the one or more user-selected low-code modules and the at least one required observability module into the application workflow to produce an executable software application for deployment.

2. The method as in claim 1, wherein the at least one required observability module is a self-composed auto-inserted executable observability low-code module.

3. The method as in claim 2, wherein the self-composed auto-inserted executable observability low-code module is hidden from a user selecting injectable low-code modules for the particular low-code application.

4. The method as in claim 1, wherein the tenant-specific policy defines weightage of attributes to calculate a sensitivity of the particular low-code application, and causes reports for the at least one required observability module to be sent at a periodic frequency based on the sensitivity of the particular low-code application.

5. The method as in claim 1, wherein the tenant-specific policy comprises a callback uniform resource locator (URL) for the particular low-code application to send reports for the at least one required observability module.

6. The method as in claim 1, wherein the at least one required observability module generates reports that are one or both of either periodic or trigger-based.

7. The method as in claim 1, wherein the tenant-specific policy comprises a policy to compute available executable low-code modules based on pre-negotiated privileges and exposure restrictions, wherein the plurality of executable low-code modules for the particular low-code application are based on a particular user and the pre-negotiated privileges and exposure restrictions.

8. The method as in claim 1, wherein the tenant-specific policy defines specifically allowed and/or disallowed executable low-code modules for the plurality of executable low-code modules for the particular low-code application.

9. The method as in claim 1, wherein the tenant-specific policy defines one or more allowed usage parameters.

10. The method as in claim 1, wherein the tenant-specific policy defines one or more of: allowed and/or disallowed network locations; allowed and/or disallowed activation times; and allowed and/or disallowed deployment geographic regions.

11. The method as in claim 1, wherein the tenant-specific policy is based on coordination with an authentication server during login of a particular user creating the particular low-code application.

12. A tangible, non-transitory, computer-readable medium having computer-executable instructions stored thereon that, when executed by a processor on a computer, cause the computer to perform a method comprising:

determining a tenant-specific policy for creation of low-code applications by a specific tenant, the tenant-specific policy specifying at least one required observability module for the low-code applications, each of the at least one required observability module representing a corresponding observability task to be performed;

presenting, via a drag and drop user interface, a plurality of executable low-code modules representing functional tasks for inclusion in an application workflow, each low-code module comprising pre-built code segments that can be programmatically linked into runnable low-code applications;

receiving user selections of one or more user-selected low-code modules of the plurality of executable low-code modules for the application workflow;

automatically enforcing, prior to finalization of the application workflow, the tenant-specific policy by inserting the at least one required observability module into the application workflow in addition to the one or more user-selected low-code modules; and generating a particular low-code application by programmatically linking the one or more user-selected low-code modules and the at least one required observability module into the application workflow to produce an executable software application for deployment.

13. The tangible, non-transitory, computer-readable medium as in claim 12, wherein the at least one required observability module is a self-composed auto-inserted executable observability low-code module.

14. The tangible, non-transitory, computer-readable medium as in claim 12, wherein the tenant-specific policy comprises a policy to compute available executable low-code modules based on pre-negotiated privileges and exposure restrictions, wherein the plurality of executable low-code modules for the particular low-code application are based on a particular user and the pre-negotiated privileges and exposure restrictions.

15. The tangible, non-transitory, computer-readable medium as in claim 12, wherein the tenant-specific policy defines specifically allowed and/or disallowed executable low-code modules for the plurality of executable low-code modules for the particular low-code application.

16. An apparatus, comprising:

one or more network interfaces to communicate with a network;

a processor coupled to the one or more network interfaces and configured to execute one or more processes; and a memory configured to store a process that is executable by the processor, the process, when executed, configured to:

determine a tenant-specific policy for creation of low-code applications by a specific tenant, the tenant-specific policy specifying at least one required observability module for the low-code applications, each of the at least one required observability module representing a corresponding observability task to be performed;

present, via a drag and drop user interface, a plurality of executable low-code modules representing functional tasks for inclusion in an application workflow, each low-code module comprising pre-built code segments that can be programmatically linked into runnable low-code applications;

receive user selections of one or more user-selected low-code modules of the plurality of executable low-code modules for the application workflow;

automatically enforce, prior to finalization of the application workflow, the tenant-specific policy by inserting the at least one required observability module into the application workflow in addition to the one or more user-selected low-code modules; and generate a particular low-code application by programmatically linking the one or more user-selected low-code modules and the at least one required observability module into the application workflow to produce an executable software application for deployment.

17. The apparatus as in claim 16, wherein the tenant-specific policy further comprises:

a policy to compute available executable low-code modules based on pre-negotiated privileges and exposure restrictions, wherein the plurality of executable low-code modules for the particular low-code application are based on a particular user and the pre-negotiated privileges and exposure restrictions.

* * * * *